United States Patent
Yamazaki et al.

(10) Patent No.: US 6,883,833 B2
(45) Date of Patent: Apr. 26, 2005

(54) KNEE PROTECTOR

(75) Inventors: Yasunobu Yamazaki, Nukatagun (JP); Yuichi Inuzuka, Okazaki (JP); Shigeyuki Suzuki, Anjyo (JP)

(73) Assignee: Mitsubishi Jidosha Kogyo Kabushiki Kaisha (JP)

(*) Notice: Subject to any disclaimer, the term of this patent is extended or adjusted under 35 U.S.C. 154(b) by 0 days.

(21) Appl. No.: 10/356,668

(22) Filed: Jan. 31, 2003

(65) Prior Publication Data
US 2003/0173763 A1 Sep. 18, 2003

(30) Foreign Application Priority Data

Jan. 31, 2002 (JP) .......................................... 2002-023402

(51) Int. Cl.[7] .............................................. B60R 21/045
(52) U.S. Cl. ......................................... 280/751; 188/377
(58) Field of Search ................................. 280/751, 752, 280/750, 748; 188/371, 377; 296/70, 187.05

(56) References Cited

U.S. PATENT DOCUMENTS 4,709,943 A * 12/1987 Yoshimura et al. ......... 280/752
5,577,770 A * 11/1996 Sinner et al. ............... 280/752
5,927,755 A * 7/1999 Matsuo et al. .............. 280/752

FOREIGN PATENT DOCUMENTS

| JP | 05213128 A | * | 8/1993 | ........... B60R/21/45 |
| JP | 06183307 A | * | 7/1994 | ........... B60R/21/45 |
| JP | 10044899 A | * | 2/1999 | ........... B60R/21/45 |

* cited by examiner

*Primary Examiner*—Peter C. English
(74) *Attorney, Agent, or Firm*—Rossi, Kimms & McDowell

(57) ABSTRACT

A knee protector is arranged in front of a seat in a vehicle, and includes a load receiving part that is comprised of an upper portion positioned or shaped suitably for a person who is relatively large in stature and a lower portion positioned or shaped suitably for a person who is relatively small in stature. Therefore, the load receiving part of the knee protector is positioned substantially in front of the knees of drivers of various statures. The knee protector can absorb the impact applied by the knees of drivers of varying statures without requiring an increase in weight or cost.

10 Claims, 7 Drawing Sheets

KNEE PROTECTOR

BACKGROUND OF THE INVENTION (1) Field of the Invention

The present invention relates to a knee protector that protects a driver in the event of head-on collision of a vehicle.

(2) Description of the Related Art

A conventionally knee protector has been provided that deforms in response to a load applied from the knees of a seated driver moving forward in the direction of the length of a vehicle in the event of head-on collision to thereby reduce an impact load applied to the knees of the driver.

Such a knee protector is arranged such that a load receiving part thereof is positioned substantially in front of the knees of the seated driver in order to receive the load applied by the knees of the driver to the knee protector in the event of head-on collision.

The knee protector is a component that is placed at a predetermined position in the vehicle, and therefore, the load receiving part thereof is also placed at a predetermined position on every occasion. The positions of the knees of seated drivers differ in horizontal and vertical directions according to their statures. Thus, the load receiving part may not be positioned in front of the knees of the seated driver, and may not sufficiently receive the load applied by the knees of the driver to the knee protector in the event of head-on collision.

To address this problem, Japanese Laid-Open Patent Publication (Kokai) No. 11-180237 has disclosed a knee protector whose width is increased in the direction of the width of a vehicle and whose length is sufficiently increased in the direction of the height of the vehicle so that the position of the knee of a driver can correspond to the position of a load receiving part of the knee protector even if the statures of seated drivers and the positions of their knees vary.

The above-mentioned prior art, however, has the problem that the increase in the size of the knee protector in the directions of the width and height of the vehicle will increase the weight of the knee protector and accordingly raises the cost.

It would therefore be desirable to provide a knee protector whose load receiving part can be positioned in front of the knees of drivers of different statures without greatly increasing the weight and the cost of the knee protector.

SUMMARY OF THE INVENTION

The present invention provides a knee protector whose load receiving part can be positioned in front of the knees of drivers of different statures without greatly increasing the weight and the cost of the knee protectors.

A knee protector according to the present invention is arranged in front of a seat in a vehicle and is shaped suitably for the stature of a driver whose positional relationship between the stature and the knees is assumed. A load receiving part of the knee protector has an upper portion thereof shaped suitably for a person who is relatively tall in stature, and a lower portion thereof shaped suitably for a person who is relatively short in stature. Therefore, it is possible to position the load receiving part of the knee protector in front of the knees of drivers of different statures, and to enable the knee protector to maintain a high capability to absorb impact without increasing the weight or cost.

More specifically, in the event of head-on collision, the load receiving part receives a load inputted from the knees of a driver who is moving forward, and the load transmitted from the load receiving part deforms a deforming part, thus displacing the load receiving part forward to sufficiently receive the load inputted from the knees of the driver.

BRIEF DESCRIPTION OF DRAWINGS

The nature of this invention, as well as other objects and advantages thereof, will be explained with reference to the accompanying drawings, in which like reference characters designate the same or similar parts throughout the figures and wherein:

FIGS. 4A to 4E are sectional views showing the knee protector of FIG. 3, wherein FIG. 4A is a sectional view taken along line 4A—4A of FIG. 3, FIG. 4B is a sectional view taken along line 4B—4B of FIG. 3, FIG. 4C is a sectional view taken along line 4C—4C of FIG. 3, FIG. 4D is a sectional view taken along line 4D—4D of FIG. 3, and FIG. 4E is a sectional view taken along line 4E—4E of FIG. 3;

DETAILED DESCRIPTION OF PREFERRED EMBODIMENTS

The present invention will now be described in detail with reference to the drawings showing a preferred embodiment thereof. It is to be understood, however, that there is no intention to limit the invention to the following embodiment, but certain changes and modifications may be possible within the scope of the appended claims.

Figure 1:
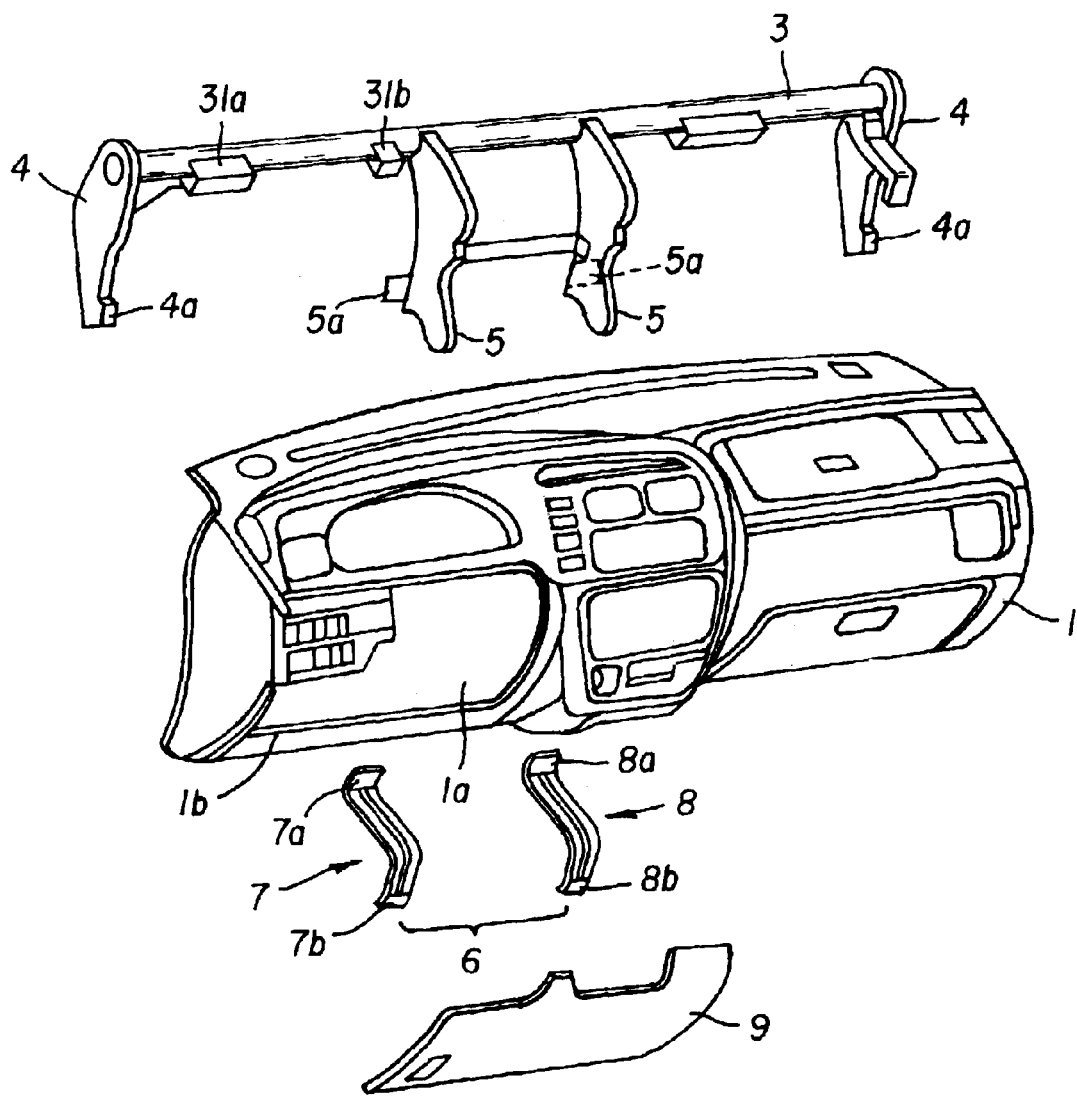
FIG. 1 is a perspective view showing a knee protector mounted on a vehicle body according to an embodiment of the present invention.
Figure 2:
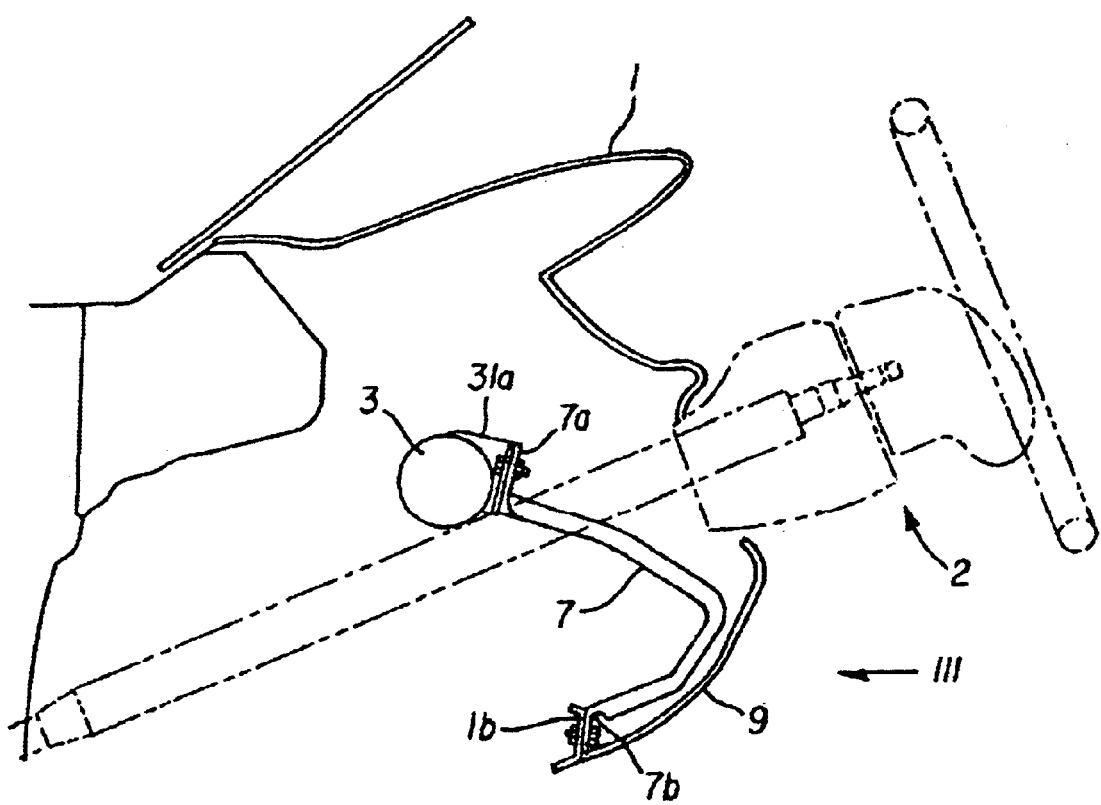
FIG. 2 is a side view showing the knee protector mounted on the vehicle body according to the embodiment.
Figure 3:
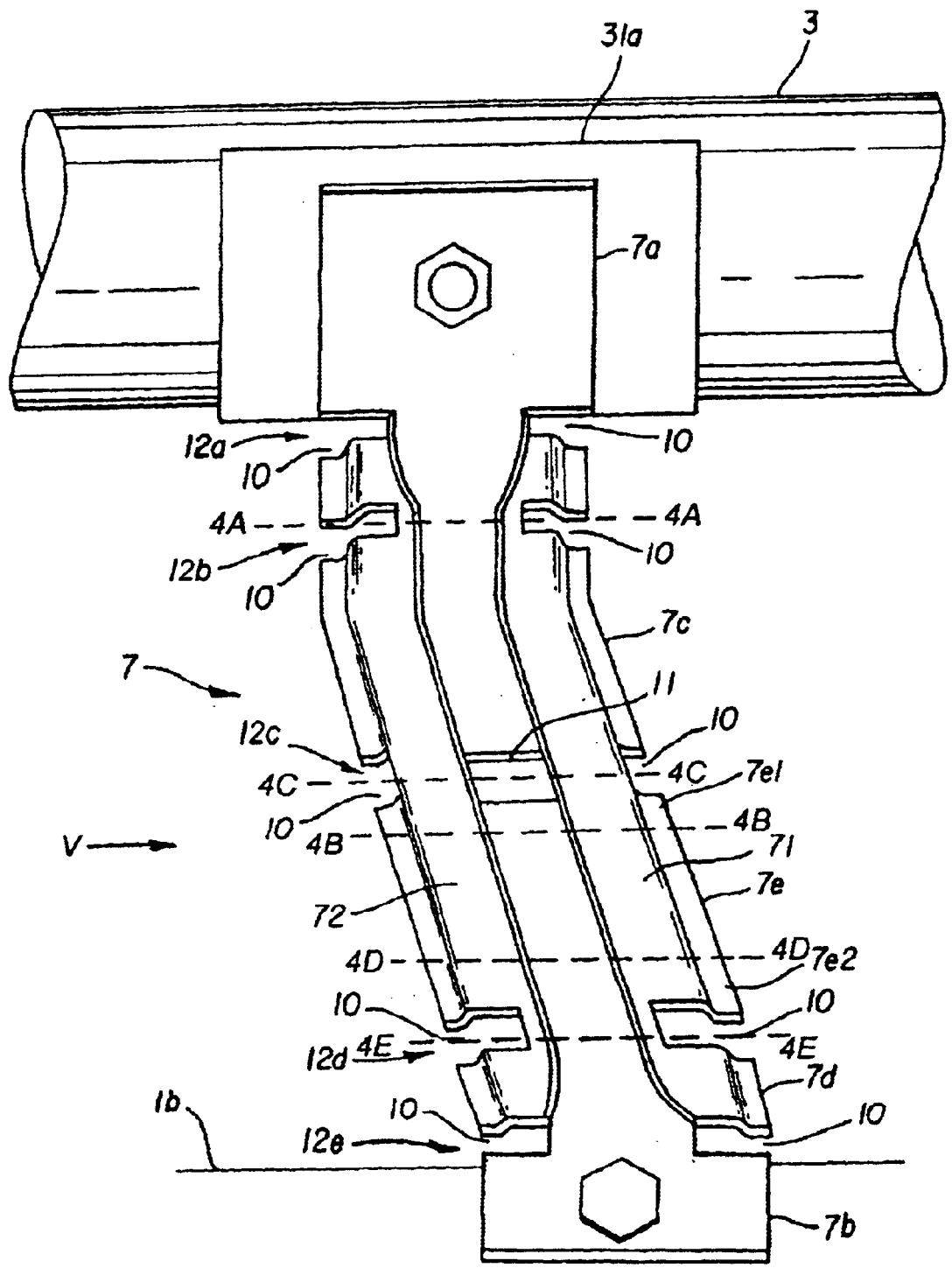
FIG. 3 is a view taken along arrow III of FIG. 2, showing a left leg knee protector according to the embodiment.
Figure 4A:
Figure 4B:
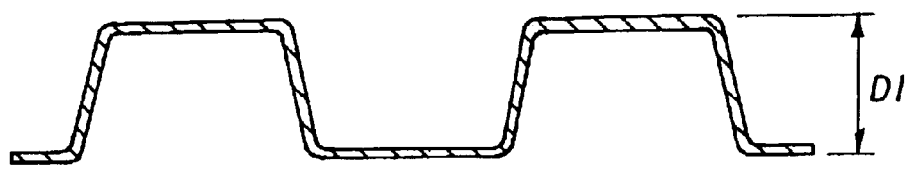
Figure 4C:
Figure 4D:
Figure 4E:
Figure 5:
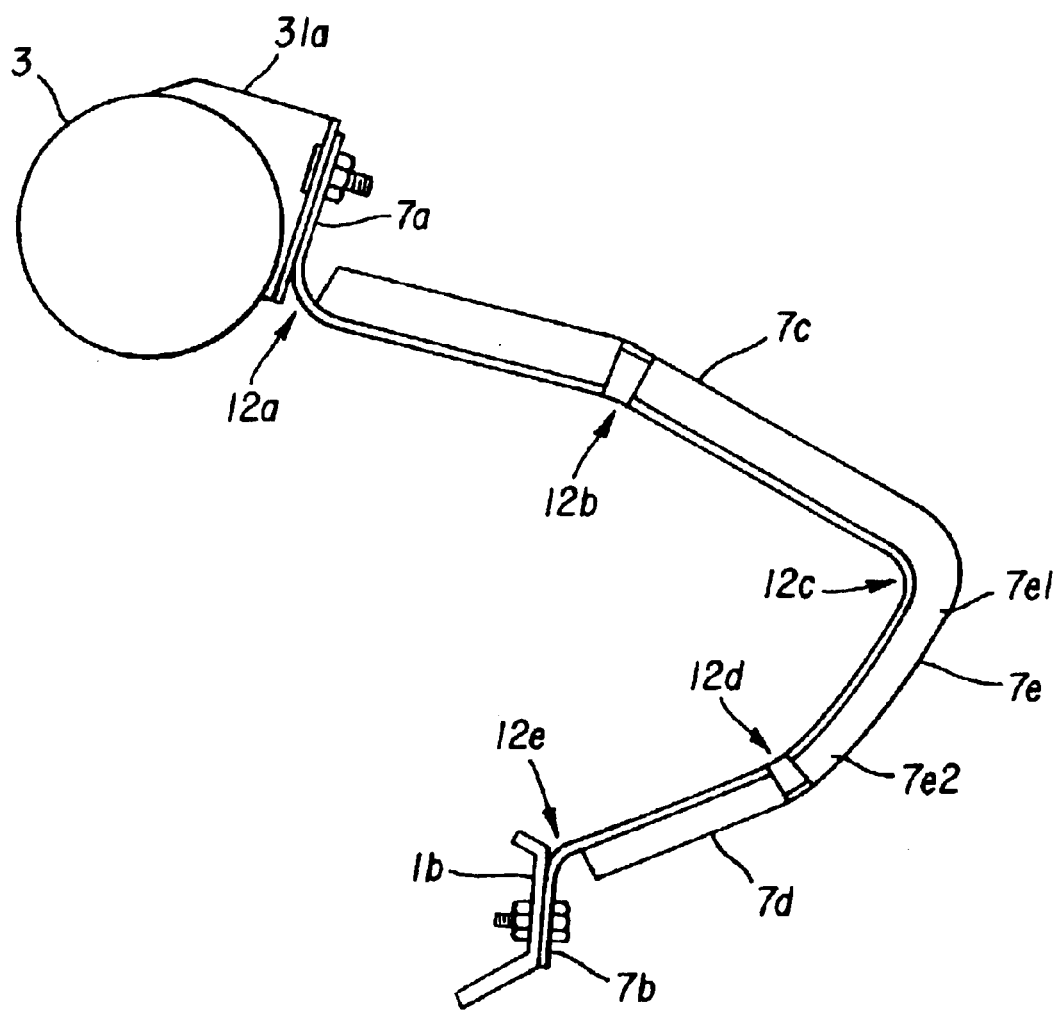
FIG. 5 is a view taken along arrow V, showing the left leg knee protector of FIG. 3.

As shown in FIGS. 1 and 2, inside an instrument panel 1, a steering support member 3 for supporting a steering column 2 is mounted on an internal wall of a vehicle body, not shown, via brackets 4 to extend in the direction of the width of a vehicle. A pair of braces 5 extending downward is attached to the central part of the steering support member 3. The instrument panel 1 is fastened on flange 4a of the brackets 4, flange 5a of the braces 5, and so forth by screws and the like.

At both sides of the steering column 2 arranged in the vicinity of a driver seat, a left leg knee protector 7 and a right leg knee protector 8 are provided as a driver seat knee protector 6. The knee protectors 7 and 8 have respective upper end flanges 7a and 8a thereof secured to mounting brackets 31a and 31b, which are welded to the steering support member 3, with bolts, nuts, and the like.

The knee protectors 7 and 8 have respective lower end flanges 7b and 8b thereof secured to a part of the instrument panel 1 in the vicinity of a lower end edge 1b of an opening 1a formed in the instrument panel 1 with bolts, nuts, and the like. An undercover 9 is attached to the instrument panel 1 such that it may close the opening 1a and cover both of the knee protectors 7 and 8.

In the event of collision of the vehicle provided with the above described knee protector 6, the left leg and the right leg of a driver are protected by the left leg knee protector 7 and the right leg knee protector 8, respectively.

FIGS. 3–7 illustrate the details of the left leg knee protector 7. The left leg knee protector 7 is formed of one strip-shaped plate, and a part thereof located between the upper end flange 7a and the lower end flange 7b is protruded rearward in the direction of the length of the vehicle (i.e. toward the driver). The part between the upper end flange 7a and the lower end flange 7b is comprised of an upper part 7c extending from the upper end flange 7a rearward in the direction of the length of the vehicle, a lower part 7d extending from the lower end flange 7b rearward in the direction of the length of the vehicle, and a load receiving part 7e that connects the upper part 7c and the lower part 7d to each other. The load receiving part 7e is comprised of an upper portion 7e1 and a lower portion 7e2.

The upper part 7c, load receiving part 7e, and lower part 7d are arranged such that, from the upper side to the lower side, substantially the whole shape thereof is inclined from the side of the seat (the side of the seat in the direction of the width of the vehicle) toward the center of the seat. From the upper side to the lower side, the load receiving part 7e is inclined downward and forward in the direction of the length of the vehicle and is inclined from the side of the seat toward the center of the seat.

The left leg knee protector 7 is formed with two beads 71 and 72 extending between the upper end flange 7a and the lower end flange 7b toward the driver. The beads 71 and 72 are formed by drawing one strip-shaped plate. The bead height D1 (FIG. 4B) of the upper portion 7e1 of the load receiving part 7e is set to be higher than the bead height D2 (FIG. 4D) of the lower portion 7e2 of the load receiving part 7e.

The left leg knee protector 7 is formed with notches 10 and an opening 11 at predetermined positions. The locations where die notches 10 and the opening 11 are formed are used as deforming parts or areas that exert an impact absorbing function by deforming when the knee of the seated driver abuts against the left leg knee protector 7 in the event of collision. The deforming parts are comprised of an upper fragile or deforming part 12a between the upper flange 7a and the upper part 7c, a first fragile or deforming part 12b provided in the upper part 7c at a substantially middle thereof, a third fragile or deforming part 12c between the upper part 7c and the load receiving part 7e, a second fragile or deforming part 12d between the load receiving part 7e and the lower part 7d, and a lower fragile part 12e between the lower part 7d and the lower end flange 7b. It should be noted that the notches 10 and the opening 11 are formed as the need arises.

The knee protector 7 is substantially arched such that the fragile parts 12b, 12c, and 12d thereof are slightly protruded and curved inward in a vehicle compartment. The fragile part 12b protrudes slightly upward and the fragile part 12d protrudes slightly downward.

The third fragile part 12c (high-stiffness deforming part) has a higher stiffness than the fragile parts 12b and 12d (low-stiffness deforming parts). Specifically, the bead height D3 (FIG. 4C) of the third fragile part 12c is set to be higher than the bead heights D4 and D5 (FIGS. 4A and 4E) of the fragile parts 12b and 12d. Namely, the third fragile part 12c is a high stiffness fragile part, and the first and second fragile parts 12b and 12d are low stiffness fragile parts, such that D3>D4 and D3>D5.

Figure 6:
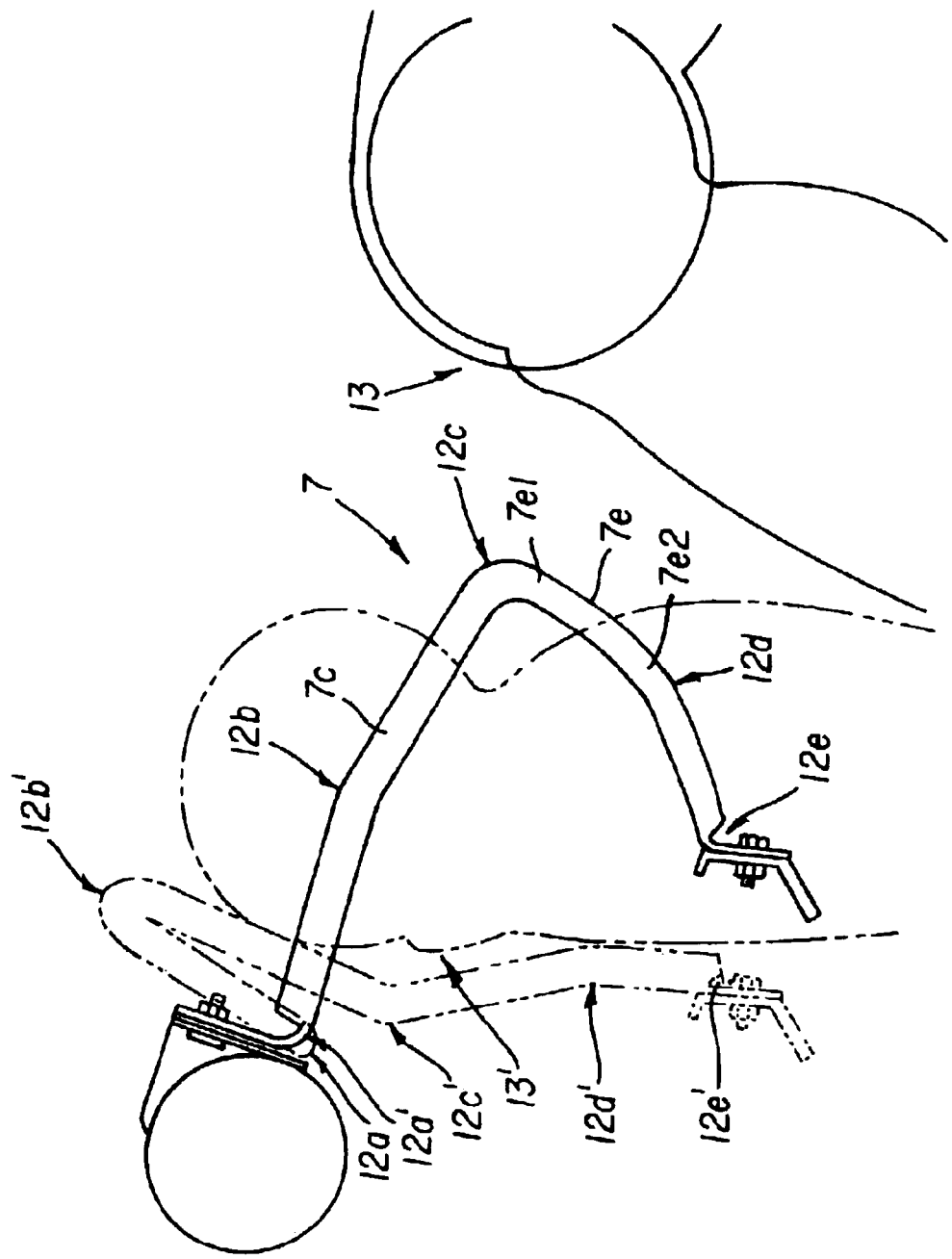
FIG. 6 is a side view showing the left leg knee protector before and after it is deformed in the case where a driver is of relatively tall stature.
Figure 7:
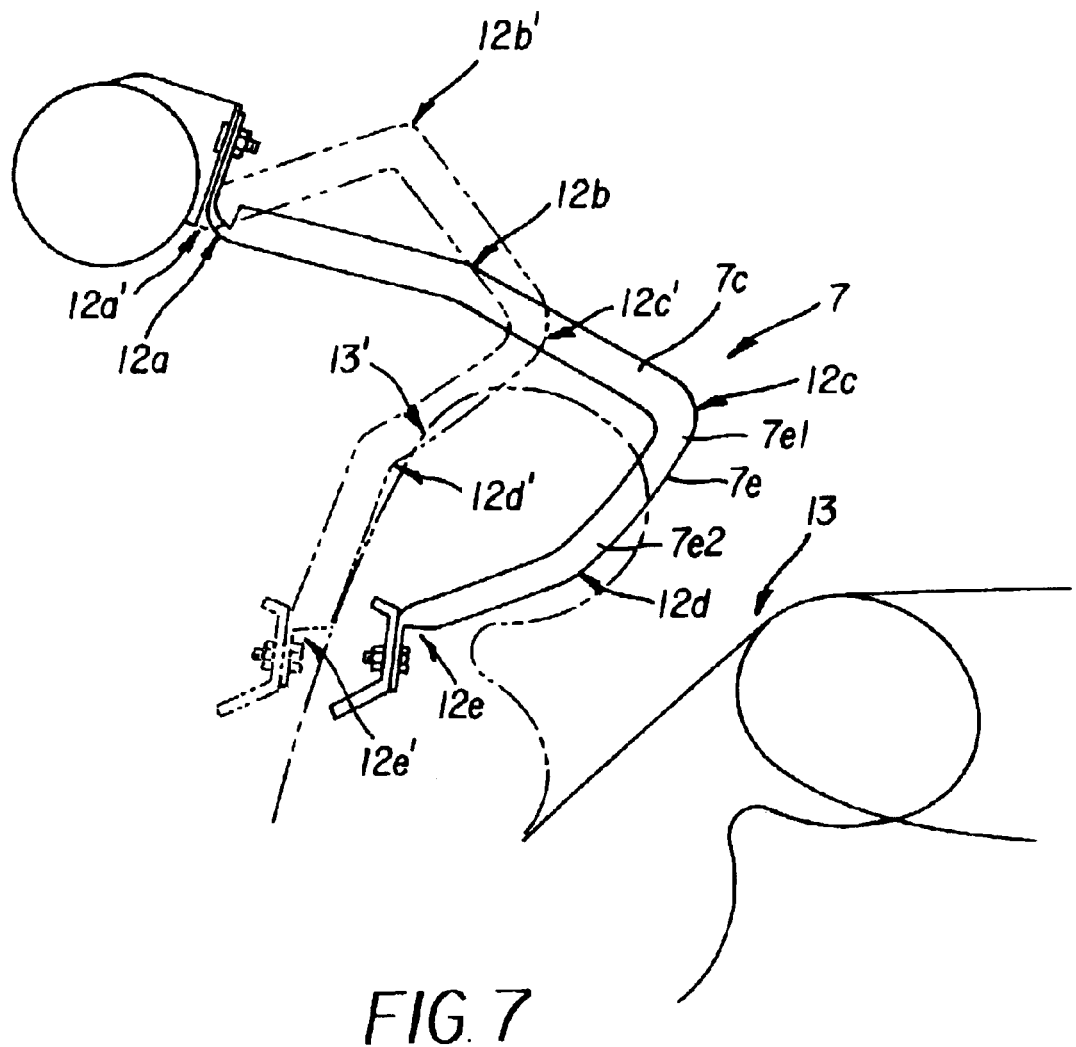
FIG. 7 is a side view showing the left leg knee protector before and after it is deformed in the case where a driver is of relatively short stature.

Referring to FIGS. 6 and 7, a detailed description will now be given of a process in which a knee 13 of the seated driver and the left leg knee protector 7 constructed as described above are abutted against each other to absorb impact in the event of collision.

If the seated driver is relatively large in stature, his or her left knee 13 is located at a higher position and is closer to the side of the seat (the side of the seat in the direction of the width of the seat) as compared with the knee of a person who is relatively small in stature. From the upper side to the lower side, the load receiving part 7e of the left leg knee protector 7 is inclined forward in the direction of the length of the vehicle and inclined from the side of the seal toward the center of the seat. Therefore, as shown in FIG. 6, the knee 13 of the driver is opposed to the upper portion 7e1 of the load receiving part 7e of the left leg knee protector 7 across the undercover 9 (not shown in FIG. 6). If the vehicle crashes in this state, the knee 13 of the driver is abutted against the upper portion 7e1 of the load receiving part 7e via the undercover 9. On this occasion, as indicated by an alternate long and short dash line (in phantom) FIG. 6, the left leg knee protector 7 deforms considerably to such an extent that the first fragile part 12b with a low stiffness protrudes upward (12b'), and therefore, the upper part 7c is folded about the first fragile part 12b and the third fragile part 12c deforms to protrude forward in the direction of the length of the vehicle. The position of the first, second, and third fragile parts 12b, 12d, 12c, and the upper and lower fragile parts 12a, 12e, when deformed, is illustrated in phantom respectively as 12b', 12d', 12c', 12a', 12e'. As a result, the knee protector as a whole is shaped like a hairpin such that the upper part 7c is folded about the first fragile part 12b, so that the knee protector can absorb the load applied by the knee 13 of the driver.

Specifically, the first fragile part 12b with a low stiffness is deformed first to bend upward in response to the advancement of the knee of the driver, thus folding the upper part 7c to enable the load receiving part 7e to deform forward in the direction of the length of the vehicle, generating an absorption stroke for impact absorption. Thereafter, the third fragile part 12c with a high stiffness is deformed about the first fragile part 12b to displace the load receiving part 7e forward in the direction of the length of the vehicle, thus generating a further absorption stroke.

On the other hand, if the seated driver is relatively small in stature, his or her left knee 13 is located at a lower position and is closer to the center of the seat (the center of the seat in the direction of the width of the seat) as compared with the knee of a person of relatively large stature. From the upper side to the lower side, the load receiving part 7e of the left leg knee protector 7 is inclined forward in the direction of the length of the vehicle and inclined from the side toward the center of the seat. Therefore, as shown in FIG. 7, the knee 13 of the driver is opposed to the lower portion 7e2 of the load receiving part 7e of the left leg knee protector 7 across the undercover 9. When the vehicle crashes in this state, the knee 13 of the driver is abutted against the lower portion 7e2 of the load receiving part 7e via the undercover 9. On this occasion, as indicated by an alternate long and short dash line of FIG. 7, the left leg knee protector 7 deforms considerably to such an extent that the second fragile part 12d protrudes forward in the direction of the length of the vehicle (12d') and the first fragile part 12b protrudes upward (12b'). As a result, the knee protector as a whole is shaped substantially like a ladle to absorb the impact applied by the knee 13 of the driver.

Specifically, the second fragile part 12d with a low stiffness is deformed about the third fragile part 12c to generate an absorption stroke for impact absorption. Further, the first fragile part 12b deforms to be folded toward the front of the vehicle, so that the third fragile part 12c strokes forward to generate an absorption stroke for impact absorption.

Although in the above described embodiment, the upper part 7c, load receiving part 7e, and lower part 7d are constructed such that, from the upper side to the lower side, substantially the whole shape thereof is laterally offset from the side of the seat toward the center of the seat, the present invention is not limited to this. For example, the knee protector may take any shape insofar as, from the upper side to the lower side, the load receiving part 7e receiving the knee 13 of the driver is laterally offset from the side of the seat toward the center of the seat. Namely, from the upper side to the lower side, the upper part 7c and the lower part 7d need not be laterally inclined from the side of the seat toward the center of the seat.

Further, the bead height D2 (FIG. 4D) of the lower portion 7e2 of the load receiving part 7e is set to be lower than the bead height D1 (FIG. 4B) of the upper portion 7e1 of the load receiving part 7e. This enables the load allowed by the upper portion 7e1 and the lower portion 7e2 of the load receiving part 7e to be varied, prevents the lower portion 7e2 of the load receiving part 7e from becoming excessively stiff against the drive, and provides the proper impact absorption when the knee of the driver of relatively small stature advances.

Further, although in the above described embodiment, the load inputted from the knees of drivers of different statures is properly absorbed by changing the stiffness of the first, second, and third fragile parts 12b, 12d, and 12c, and the load allowed by the upper portions 7e1 and 7e2 of the load receiving part 7e, the present invention is not so limited. The board thickness of the knee protector may also be varied. Specifically, the board thickness of the knee protector may be larger at a part requiring a higher stiffness and smaller at a part requiring a lower stiffness.

The right leg knee protector 8 and the left leg knee protector 7 are shaped symmetrically about the steering column 2, and thus, a detailed description of the right leg knee protector 8 is omitted. It should be noted that the inclination of the right leg knee protector 8 inclined from the side of the seat toward the center of the seat may be determined independently of the left leg knee protector 7, and it is possible that only one of the left leg knee protector 7 and the right leg knee protector 8 may be inclined.

The above described driver seat knee protector 6 according to the embodiment of the present invention is constructed such that, from the upper side to the lower side, the load receiving part 7e is inclined from the side of the seat toward the center of the seat, and thus, even if the position of the knee 13 of the driver varies according to his or her stature, the load receiving part 7e can be positioned in front of the knee 13. Therefore, the load receiving part 7e can receive the knee 13 of the driver in the event of collision regardless of the stature of the driver. Consequently, the driver seat knee protector 6 can effectively absorb impact.

Particularly if a driver is relatively large in stature, the first fragile part 12b and the third fragile part 12c cooperate with each other to deform the knee protector 7 as a whole substantially like a hairpin as described above, so that the knee protector 7 can absorb and receive the load inputted from the knee of the driver who is relatively large in stature. If a driver is relatively small in stature, the first fragile part 12b and the third fragile part 12c cooperate with each other to deform the knee protector 7 as a whole substantially like a ladle as described above, so that the knee protector 7 can absorb and receive the load inputted from the knee of the driver who is relatively small in stature.

Specifically, the fragile parts such as the first fragile part 12b, third fragile part 12c, and second fragile part 12d cooperate with each other to deform differently according to the stature of a driver, so that the knee protector as a whole can be deformed differently. Therefore, the knee protector can properly absorb and receive load inputted from the knees of drivers of different statures.

Further, even if the position of the knee 13 of the seated driver varies according to the stature of a driver, the load receiving part 7e can be positioned in front of the knee 13, and therefore, the driver seat knee protector 6 can have the minimum width required for the driver seat knee protector 6 to achieve the impact absorption effect without increasing the weight and cost of the drive seat knee protector 6.

Further, due to the reduction in the space required for the knee protector, it is possible to effectively use the space around the steering column.

What is claimed is:

1. A knee protector for an occupant in a vehicle, comprising:
    an upper end flange for mounting to the vehicle;
    a lower end flange for mounting to the vehicle below said upper end flange;
    an upper part extending from said upper end flange;
    a lower part extending from said lower end flange;
    a load receiving part having an upper portion and a lower portion extending between said upper part and said lower part, said load receiving part being adapted to be positioned in front of a seat of the vehicle for receiving a load from a knee of the occupant seated on the seat when the knee of the occupant moves forward in the event of a collision, said load receiving part being configured to receive loads applied by occupants of varying statures; and
    a plurality of deforming areas configured to be deformed by the load received by said load receiving part to displace said load receiving part forward, said deforming areas being located between said upper and lower end flanges,
    wherein said lower portion of said load receiving part is offset laterally toward a center of the seat in a direction of a width thereof from said upper portion of said load receiving part to compensate for occupants of a smaller stature.

2. A knee protector according to claim 1, wherein said load receiving part is formed of a plate member in which said upper portion and said lower portion of said load receiving part are continuous.

3. A knee protector according to claim 2, further comprising:
    a bead formed in each of said upper portion of said load receiving part and said lower portion of said load receiving part,
    wherein a height of said bead is higher in said upper portion of said load receiving part than in said lower portion of said load receiving part.

4. A knee protector according to claim 1, wherein said lower end flange is offset laterally toward the center of the seat in the direction of the width thereof from said upper end flange.

5. A knee protector according to claim 1, wherein:
said upper portion of said load receiving part is thicker than said lower portion of said load receiving part.

6. A knee protector according to claim 1, wherein one of said deforming areas is provided between said upper portion of said load receiving part and said upper part, and another of said deforming areas is provided between said lower portion of said load receiving part and said lower part, the one deforming area having a higher stiffness than the another deforming area.

7. A knee protector according to claim 1, wherein said deforming areas comprise a first deforming area formed in said upper part, a second deforming area formed between said lower portion of said load receiving part and said lower part, and a third deforming area formed between said upper portion of said load receiving part and said upper part, and wherein said third deforming area has a higher stiffness than said first and second deforming areas.

8. A knee protector according to claim 7, wherein said first deforming area is configured to be deformed in a direction to protrude upward and said second deforming area is configured to be deformed forward in a direction of a length of the vehicle upon said lower portion of said load receiving part receiving the load from the knee of the occupant.

9. A knee protector according to claim 7, wherein said first deforming area is configured to be deformed in a direction to protrude upward and said third deforming area is configured to be deformed forward in a direction of a length of the vehicle upon said upper portion of said load receiving part receiving the load from the knee of the occupant.

10. A vehicle having a knee protector for an occupant, the knee protector comprising:
an upper end flange mounted to the vehicle;
a lower end flange mounted to the vehicle below the upper end flange;
an upper part extending from the upper end flange;
a lower part extending from the lower end flange;
a load receiving part having an upper portion and a lower portion extending between the upper part and the lower part, the load receiving part positioned in front of a seat of the vehicle for receiving a load from a knee of the occupant seated on the seat when the knee of the occupant moves forward in the event of a collision, the load receiving part being configured to receive loads applied by occupants of varying statures; and
a plurality of deforming areas configured to be deformed by the load received by the load receiving part to displace the load receiving part forward, the deforming areas being located between the upper and lower end flanges,
wherein the lower portion of the load receiving part is offset laterally toward a center of the seat in a direction of a width thereof from the upper portion of the load receiving part to compensate for occupants of a smaller stature.

* * * * *